US005195641A

United States Patent [19]

Signoretto

[11] Patent Number: 5,195,641

[45] Date of Patent: Mar. 23, 1993

[54] SORTING LINE FOR PROCESSING ENVELOPES, PARTICULARLY FOR PHOTOGRAPHIC LABORATORIES

[75] Inventor: Roberto Signoretto, Olmo Di Martellago, Italy

[73] Assignee: Systel International S.p.A., Italy

[21] Appl. No.: 599,013

[22] Filed: Oct. 17, 1990

[30] Foreign Application Priority Data

Oct. 24, 1989 [IT] Italy .............................. 84159 A/89

[51] Int. Cl.[5] ........................ B07C 5/342; B65G 47/46

[52] U.S. Cl. .................................... 209/698; 198/365; 198/369; 209/900; 209/912; 414/271

[58] Field of Search ............... 209/698, 584, 583, 900, 209/933, 912; 198/365, 366, 369, 370, 703, 704; 414/271, 268, 269

[56] References Cited

U.S. PATENT DOCUMENTS

| | | | |
|---|---|---|---|
| 1,170,091 | 2/1916 | Molyneux | 209/900 X |
| 2,669,365 | 2/1954 | Gourdon | 209/900 X |
| 2,689,657 | 9/1954 | Lens | 198/365 |
| 3,637,066 | 1/1972 | Idskov et al. | 198/365 X |
| 4,249,663 | 2/1981 | Hewlett | 209/933 X |
| 4,310,276 | 1/1982 | Castagnoli | 209/698 X |
| 4,509,635 | 4/1985 | Emsley | 209/900 X |
| 4,688,678 | 8/1987 | Zue et al. | 209/900 X |
| 4,716,711 | 1/1988 | Signoretto . | |
| 4,779,122 | 10/1988 | Signoretto . | |
| 4,800,406 | 1/1989 | Signoretto . | |
| 4,881,090 | 11/1989 | Signoretto . | |
| 4,895,242 | 1/1990 | Michel | 209/900 X |
| 4,932,189 | 6/1990 | Signoretto . | |
| 4,964,499 | 10/1990 | Morikiyo et al. | 198/365 |
| 4,973,035 | 11/1990 | Signoretto . | |

FOREIGN PATENT DOCUMENTS

| | | | |
|---|---|---|---|
| 391971 | 7/1973 | U.S.S.R. | 209/698 |

*Primary Examiner*—Donald T. Hajec

*Attorney, Agent, or Firm*—Hoffman, Wasson & Gitler

[57] ABSTRACT

A sorting line for processing envelopes, particularly for photographic laboratories, including at least one endless conveyor, for a plurality of boxes, provided with a base which opens under a command correlated with the position of the boxes along their path and a plurality of compartments arranged on several levels in a position below the endless conveyor and provided with upperly open communication channels which emerge in positions corresponding with the different positions in which the base of the boxes opens.

8 Claims, 5 Drawing Sheets

SORTING LINE FOR PROCESSING ENVELOPES, PARTICULARLY FOR PHOTOGRAPHIC LABORATORIES

This invention relates to a sorting line for processing envelopes, particularly for photographic laboratories.

BACKGROUND OF THE INVENTION

As photography develops there is an increasing availability of photographic laboratories which develop and print films originating from photographic shops. In practice the amateur or professional photographer hands the exposed films to the shop for developing and printing, and the shop transmits them to the photographic laboratory after inserting them into envelopes known as "processing envelopes".

Here, after extraction from the processing envelopes, they are developed and printed, and after treatment the negatives and prints are reinserted into the processing envelope to be returned to the shop, which then consigns them to the customer.

The complete operational cycle undergone in the photographic laboratory, i.e. the cycle commencing with the reception of the processing envelopes and terminating with the re-delivery of the processing envelopes, has as its final stage the sorting of these envelopes originating from the finishing stage into suitable bags or boxes or other containers corresponding to the different destinations of the envelopes themselves. These destinations can be individual shops if these involve large quantities of processing envelopes, or can be a group of shops where smaller quantities of processing envelopes are concerned.

In either case there is the problem of effecting this sorting in the most reliable, fast and simple manner possible. These requirements can clearly be satisfied to a greater degree the finer the distribution, i.e. the narrower the division of the processing envelopes into their different destinations.

However this requirement, which could be totally satisfied if it were possible to reserve one container for each shop, i.e. for each destination, is however opposed by containing the space requirements of a sorting line within acceptable limits, these requirements being greater the narrower the division into the various destinations. For example, a sorting line for processing envelopes is known comprising essentially an endless mobile chain, to which bottom-openable pockets are applied. Below the path of the pockets there are provided a plurality of bags for collecting the envelopes, to correspond to the different customers or to the particular customer groupings. The processing envelopes originating from the finishing station are inserted automatically into the successive pockets, which then cause them to fall into the bag corresponding to the particular envelope destination, this destination having been previously read from the envelope and used, by means of the reading signal, to cause the various pockets to open when these are positioned exactly above the corresponding bag.

However this known processing envelope sorting line has the drawback of a large plan area and an unsatisfactory limit to the maximum number of bags or boxes which the plant can serve.

A further drawback is that the need to group together several destinations during the sorting stage requires a subsequent sorting operation, which is generally effected manually with the aid of a pigeon hole system, and consequently requires further space due to the presence of the pigeon hole system, plus manual operations which slow down and thus increase the cost of the whole sorting operation.

SUMMARY OF THE INVENTION

All these drawbacks are obviated according to the invention by a sorting line for processing envelopes, characterised by comprising at least one endless conveyor for a plurality of boxes provided with a base which opens under a command correlated with the position of said boxes along their path, and a plurality of compartments arranged on several levels in a position below said endless conveyor and provided with upperly open communication channels which emerge in positions corresponding with the different positions in which the base of said boxes opens.

A preferred embodiment of the present invention is further described hereinafter with reference to the accompanying drawings, in which:

DETAILED DESCRIPTION OF THE INVENTION

Figures 1, 2:
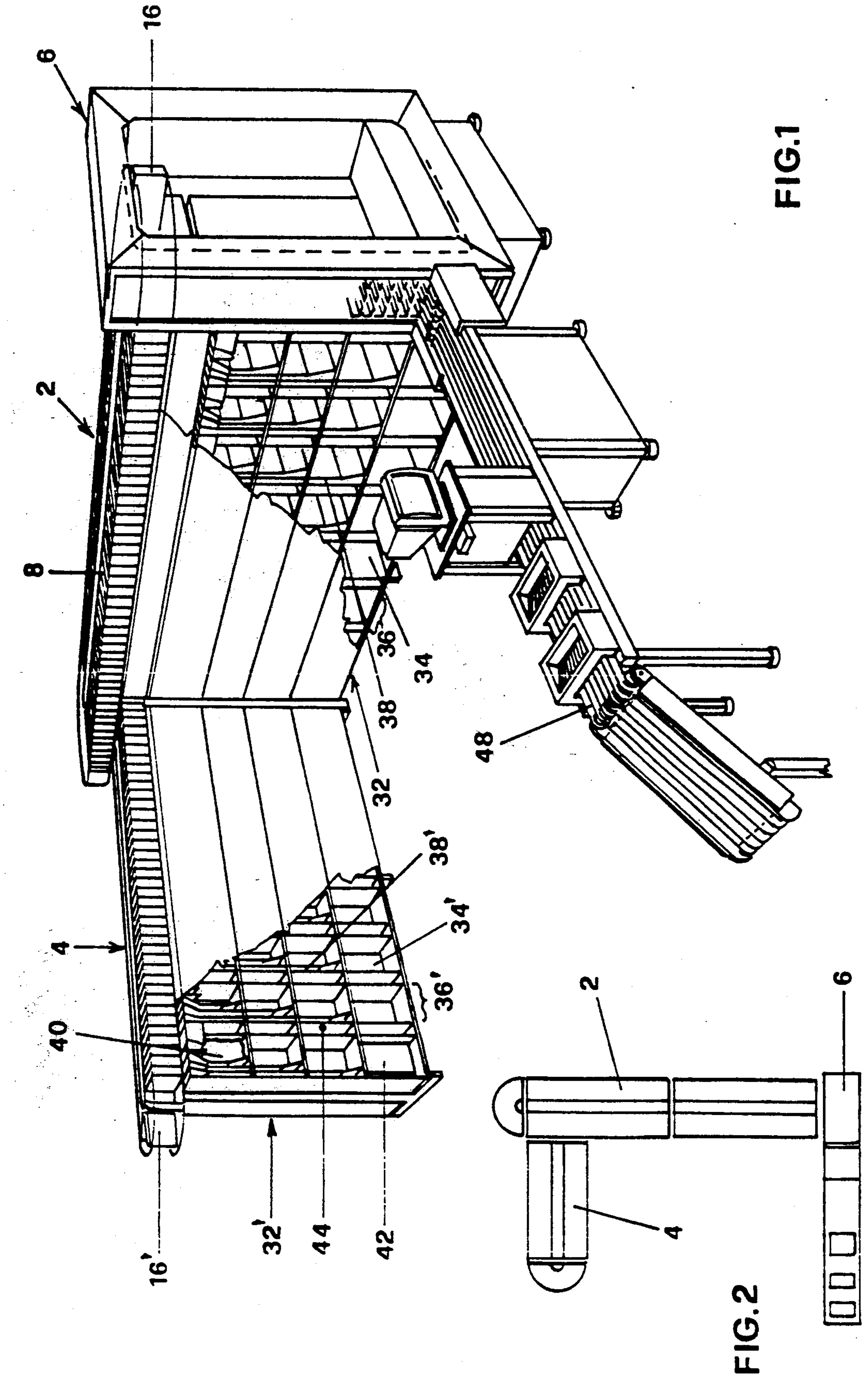
FIG. 1 is a general schematic perspective view of a sorting line according to the invention.
FIG. 2 is a plan view thereof to a reduced scale.
Figure 6:
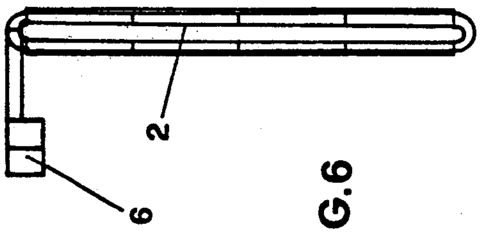
FIGS. 3 to 9 are plan views of further possible plant configurations.
Figure 5:
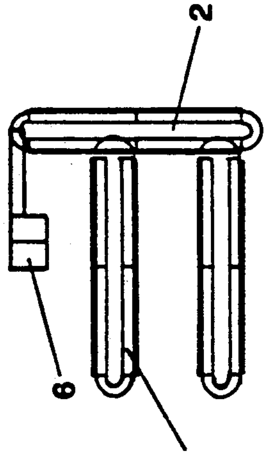
Figure 4:
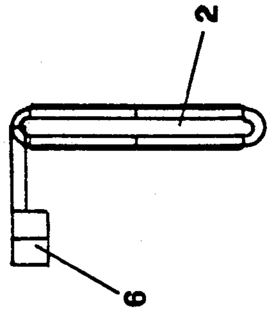
Figure 3:
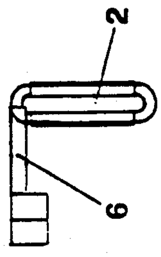
Figure 9:
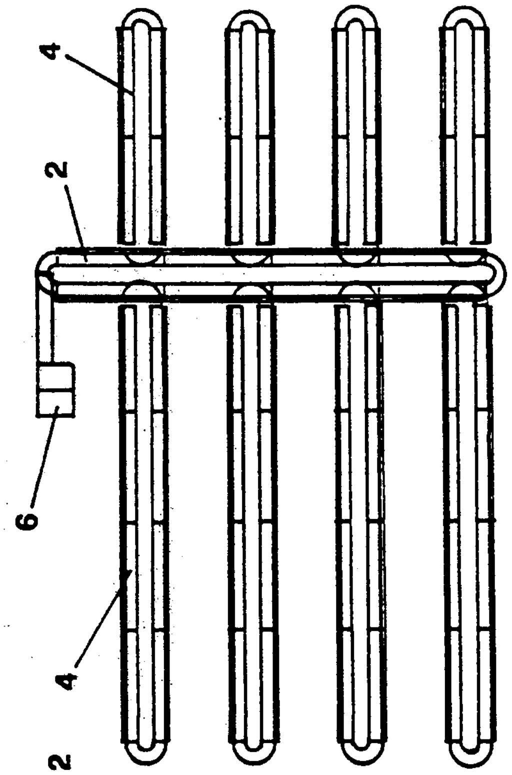
Figure 8:
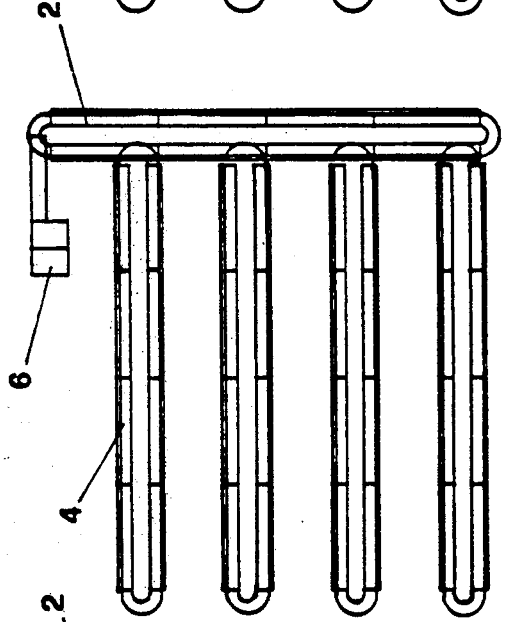
Figure 7:
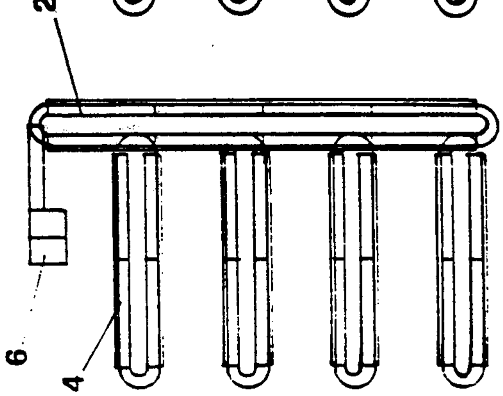
Figure 10:
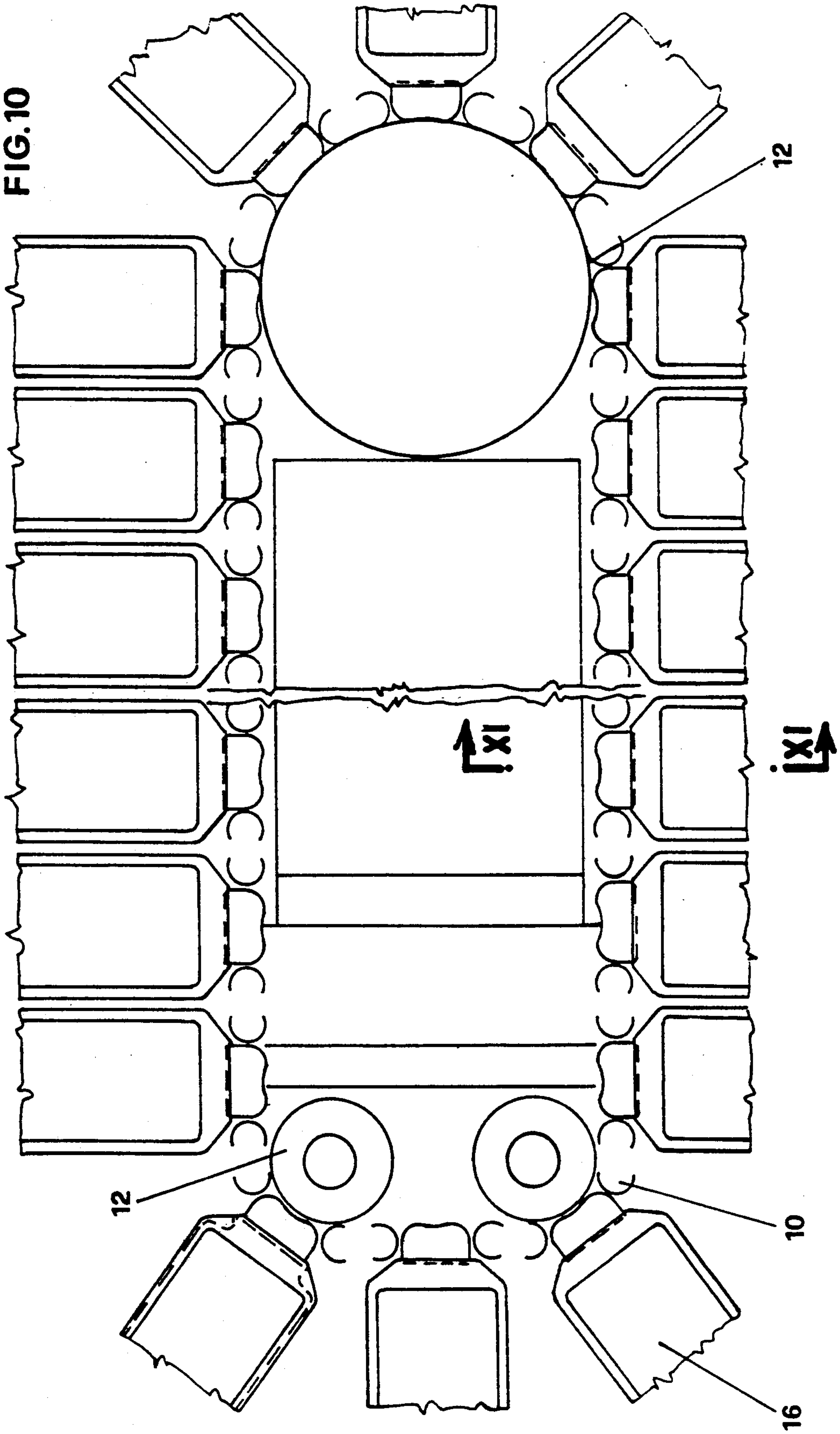
FIG. 10 is an enlarged detailed plan view of the member for conveying the boxes along a line branch.
Figure 11:
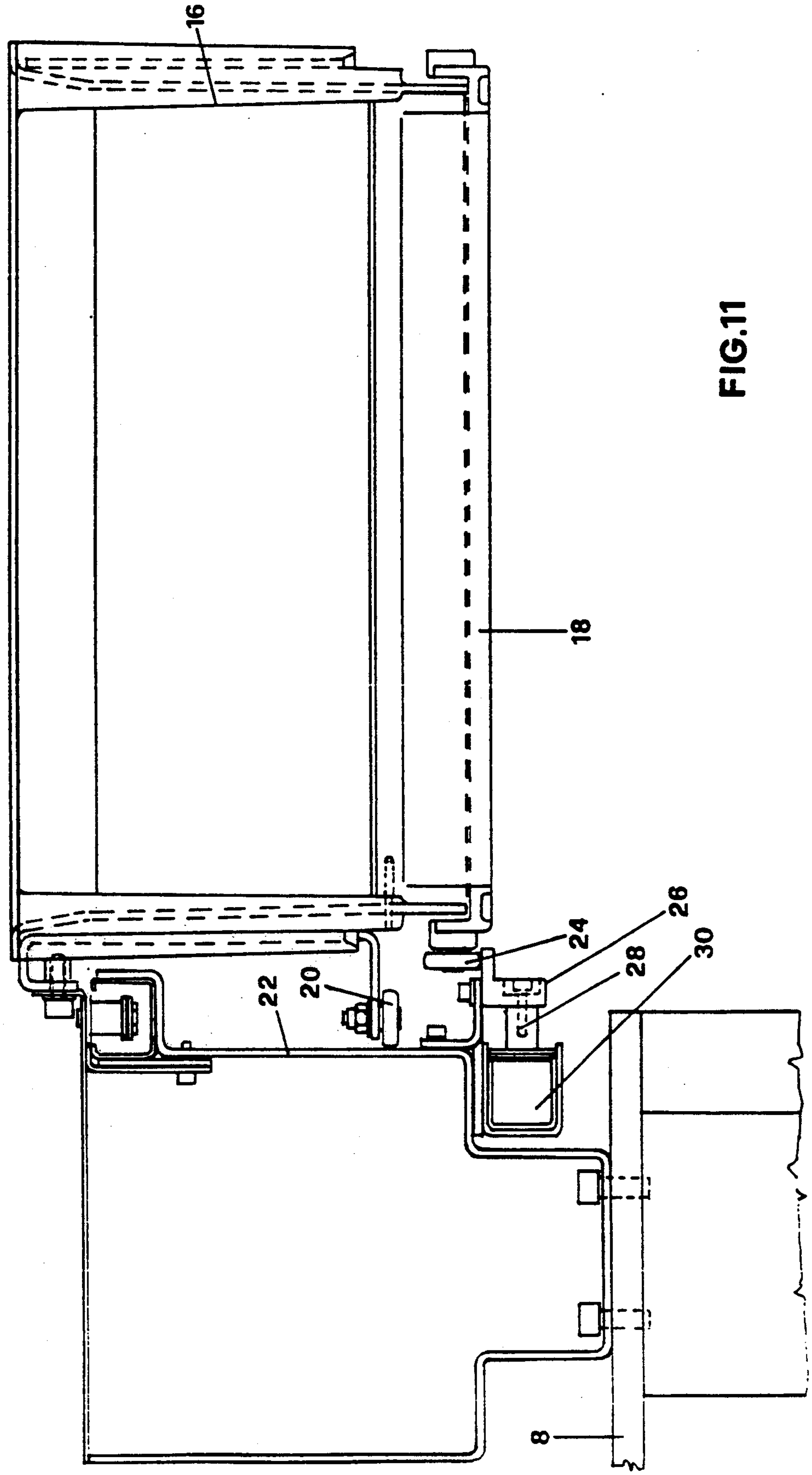
FIG. 11 is a vertical section on the line XI—IX of FIG. 10.
Figure 12:
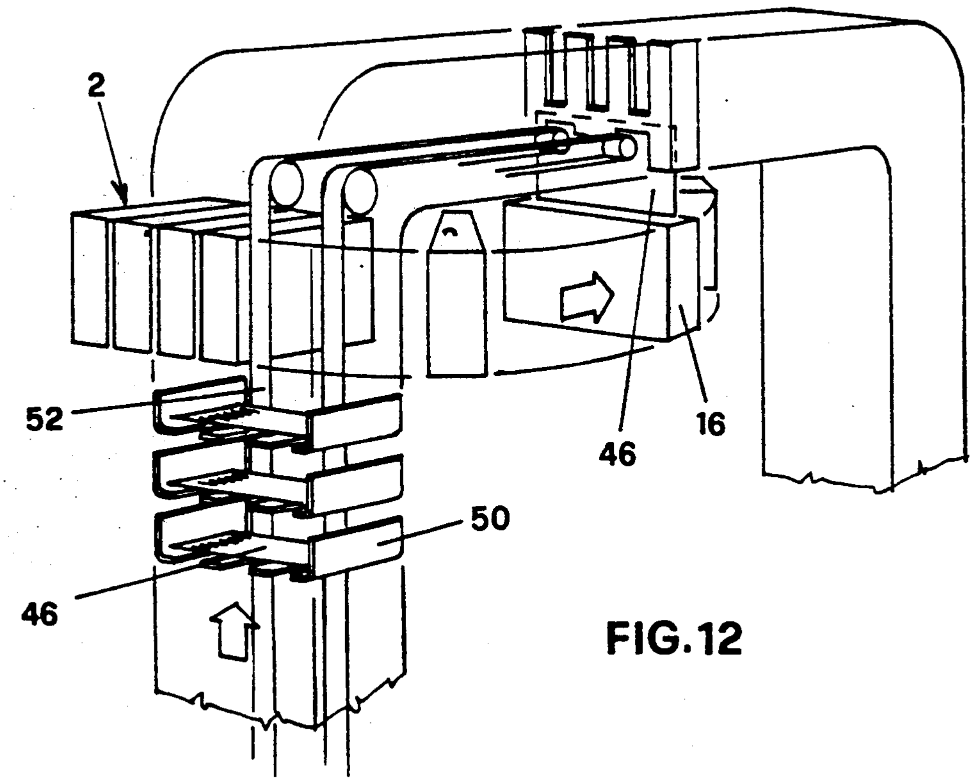
FIG. 12 is a detailed schematic perspective view of the connection region between the feeder and the sorting line.

As can be seen from the figures, the line according to the invention comprises essentially a main leg indicated overally by 2, and a plurality of branch legs arranged perpendicularly to the main leg and indicated overally by 4. The line also comprises a feeder 6 which as in the case of the legs 2 and 4 is described in detail hereinafter.

Both the main leg 2 and the branch legs 4 comprise, on a frame 8, an endless chain 10 extending horizontally between two end sprockets 12, one of which is associated with a conventional electric motor (not shown) for its movement.

To the links of the chain 10 there are fixed a plurality of upperly open parallelepiped boxes 16,16' having their side walls slightly converging downwards and their base 18 formed in the manner of a trapdoor, i.e. hinged along one side to the lower edge of a side wall so as to lie substantially vertical by gravity if not otherwise retained, and so lowerly open the corresponding box. The box 16,16', which is projectingly fixed to the corresponding link of the chain 10, is provided lowerly with a roller of vertical axis, which during the horizontal movement of the box rests against the vertical wall 22 of a section bar forming part of the frame 8.

A further roller 24,24' of horizontal axis is applied to each box 16,16' on the side opposite that which is hinged to the side wall of the box, to run along a horizontal guide 26,26' consisting of a plurality of segments 28 placed one behind the other. The position of the guide 26,26' is such that when the roller 24,24' rests against it, the base 18,18' of the corresponding box 16,16' lies horizontal (box closed). In addition, each segment 28 is connected to an electromagnet 30 which when powered causes it to move rearwards, so that said roller 24,24' no longer rests against it.

Figure 13:
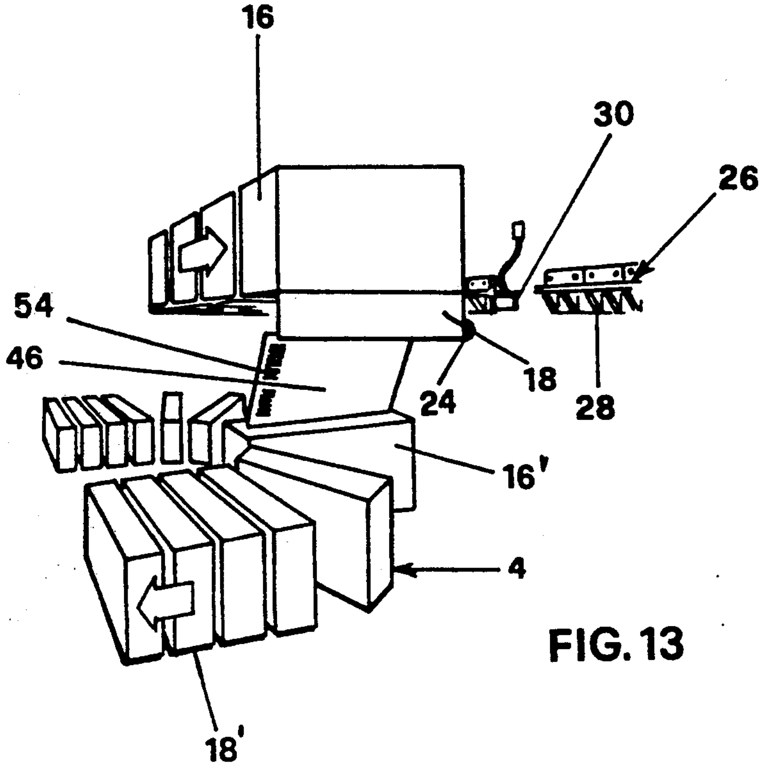
FIG. 13 is a detailed perspective view of the connection region between two line branches.

The plane in which the boxes 16 of the main leg 2 move is higher than the plane in which the boxes 16' of the branch legs 4 move, and more specifically the lowest level reached by the base 18 of the boxes 16 of the main leg 2 when said base is open is just higher than the level of the upper opening of the boxes 16' of each branch leg 4. In addition the position of each branch leg 4 compared with the main leg 2 is such that the position assumed by each box of this latter at an end position, i.e. when said box 16' lies exactly in the longitudinal middle plane through said branch leg 4, is exactly below the position of a box 16 of the main leg 2 (see FIG. 13).

In a position below the main leg 2 and branch legs 4 there are provided a plurality of cabinets 32,32' which extend horizontally following the horizontal extension of the main and branch legs and also vertically, to define a series of superimposed compartments 34,34'. More specifically, each cabinet 32,32' is divided horizontally into base modules 36,36' each formed of a plurality of superimposed compartments 34,34' (four on the drawing), associated with channels 38,38' which open upperly in a position exactly below the path of the corresponding boxes 16,16'. For the purpose of coordinating the various operating stages, the position of the upper opening of each channel 38,38' corresponds with the position of the mobile segments 28 of the corresponding horizontal guide 26,26', so that, as will be apparent hereinafter, when the base 18,18' of each box 16,16' opens, the processing envelope 46 contained in it exactly enters a channel 38,38'.

Again for the reasons which will be apparent hereinafter, those base modules of the cabinet 32 lying below the main leg 2 are provided only at those portions of said leg which are not involved with branch legs 4, and thus in practice it can happen that only the branch legs 4 are provide with underlying cabinets 32,32'. In the example shown in FIG. 1 only one branch leg 4 is associated with the main leg 2, and thus both these are provided with an underlying cabinet 32,32'. It is however apparent that if further branch legs are provided parallel to and side by side with the branch leg 4, the main leg 2 would be without an underlying cabinet, or at the most could be provided with cabinet portions only in the spaces between adjacent branch legs.

Each compartment 34,34' of each cabinet 32,32', which is open frontally for accessibility reasons, houses a removable container, which according to the dimension of the compartment can be either a bag 40 or a box 42.

In addition in proximity to the lower part of each channel 38,38' there is provided an optical sensor 44 the purpose of which is to sense both that correct passage of the processing envelope 46 has occured, as will be apparent hereinafter, and that the removable container placed in the corresponding compartment 34,34' has been filled.

The feeder 6 is situated at one end of the main leg 2. It is located downstream of a conventional manual or automatic feed line indicated overally by 48 and comprises a tray elevator 50 which for a certain distance runs parallel to and at the same speed as a belt conveyor 52. More specifically, the belt conveyor 52 runs parallel to the interior of the tray elevator 50 for the entire vertical lifting distance plus a subsequent horizontal distance which terminates at the longitudinal middle plane through the main leg 2, exactly in a position above the box 16 which is passing along that plane.

The tray elevator 50 and belt conveyor 52 are driven by a single electric motor, synchronized with the electric motors of the chains 10, so as to ensure that when a box 16' of the branch leg 4 is exactly in the longitudinal middle plane of the branch leg itself, there is a box 16 of the main leg 2 exactly above it. In addition the various electromagnets 30 which operate the segments 28 of the horizontal guides 26,26' are connected to a computer (not shown) which controls the entire sorting line.

The operation of the described sorting line is as follows: the already filled processing envelopes 46 reach the feed leg 48 one by one, where they undergo the conventional operations including the reading of the envelope identification data, the printing of a self-adhesive label and the application of this to the envelope. The identification data on the processing envelope, which also include data identifying its final destination, are generally contained in a number 54 written in bar code on the envelope.

Each envelope 46 is then fed between the trays of the elevator 50 and is raised thereby. When it reaches the upper end of the ascending vertical path and commences the horizonal path, it rests lowerly on the conveyor belts 52, which advance synchronously with the trays 50.

On reaching the front end of said belt conveyor 52, this no longer offers any support and the processing envelope 46 falls into a box 16 of the main leg 2, which by virtue of the synchronization between the movement of the tray elevator 50 and the movement of the chain 10 of said main leg 2, is correctly positioned to receive it.

The envelope 46 thus inserted into the box 16 of the main leg 2 advances along this latter. Assuming that the destination compartment 34' pertains to the branch leg 4, when the box 16 comes into proximity with that particular branch leg, a command is fed by the computer, which had previously memorized the identification data of that envelope and the identification data of the destination compartment, to cause the corresponding electromagnet 30 to retract the segment 28 associated with it, and consequently interrupt the horizontal guide 26 of the main leg 2 on the middle plane of the branch leg 4.

Consequently when the roller 24 of the box 16 reaches this gap, it loses its support and allows the base 18 to open by gravity, so that the processing envelope 46 (see FIG. 13) falls onto the underlying box 16' of the branch leg 4, which is in an assured correct position because of the synchronization between the movements of the chains 10 of the two legs 2 and 4.

When the envelope 46 has entered the box 16' of the branch leg 4, it is carried by this box to the upper opening of that channel 38 corresponding to the destination compartment 34'. Here a command fed to the electromagnet 30 of that segment 28 of the guide 26*a* of this branch leg 4 which corresponds to that particular channel 38' causes the base 18' of the box 16' to open and allow the processing envelope 46 to fall into said channel, at the lower end of which there has previously been placed a bag 40 or box 42.

After the box 16 of the main leg 2 or 16' of the branch leg 4 has deposited the processing envelope 46 in the box 16' of the branch leg 4 or in the channel 38' respectively, it proceeds on its path until the end of the straight portion of the respective leg, where there is provided an inclined surface (not shown) against which the roller 24,26' rests to again close the base 18,18' of the box and arrange it to receive a new processing envelope.

If the destination compartment 34 for the processing envelope 46 pertains not to the cabinet 32' of a branch leg 4 but to the cabinet 32 of the main leg 2, there will obviously be a direct transfer of the envelope 46 from the box 16 of the main leg 2 to the channel 38 of that compartment 34.

Should the opening of the base 18,18' of a box 16,16' be impeded or should a processing envelope 46 become jammed during its travel along the channel 38,38', the lack of sensing by the sensor 44 results in the emission of an alarm signal to allow the supervising personnel to investigate. An analogous signal is also emitted when the container 40 or 42 is nearly full to enable the supervising personnel to replace this container with an empty one.

From the aforegoing it is apparent that the sorting line according to the invention is considerably more advantageous than conventional lines, and in particular:

it comprises a large number of installed compartments; in practice for a surface area of about 140 $m^2$, it is possible to install more than 1200 compartments against the approximately 500 compartments currently installable for a similar area;

it provides very high line flexibility, because of the possibility of covering any shape and size of surface;

it can be installed in an existing line with modifications and extensions of any kind and size;

it enables the entire sorting system to be totally automated, thus eliminating any manual redistribution work and also eliminating the manual sorting pigeon hole systems and the inconvenience of the space requirement and limited operability connected with them;

it provides complete protection for the processing envelopes as these are practically subjected to no handling during sorting;

it is of very safe and reliable operation and of low power consumption, being based on the simple horizontal movement of chains, electromagnetic ON-OFF controls and opening by gravity;

it allows the capacity of each compartment to be chosen and hence the line to be adapted to the different volume requirements of the various customers;

it enables each compartment to be equipped with a space for professional material and specifically for other-format prints, or publicity material, and for stamps etc. for the subsequent despatch.

I claim:

1. A sorting line for processing envelopes comprising at least one endless conveyor for a plurality of boxes provided with a base which opens under a command correlated with the position of said boxes along their path; and a plurality of compartments, arranged on several levels in a position below said endless conveyor, and provided with upperly open communication channels which emerge in positions corresponding with the different positions in which the base of said boxes opens wherein said boxes are provided with a gravity-openable base which is kept closed by interference between an operating appendix thereof and a guide extending along the endless conveyor, gaps being produced on command in said guide at that point of said endless conveyor in which said base is to be made to open and wherein said sorting line further comprises a feeder for automatically inserting processing envelopes into said boxes, said feeder comprising a tray elevator which receives said processing envelopes from a feed line and after raising them to a height exceeding the upper edge of said boxes inserts them, when in a predetermined position, into an underlying box ready to receive them whereby said tray elevator extends vertically through at least one section to raise the horizontally arranged processing envelopes to a height exceeding the upper edge of the boxes, and then extending horizontally through a further section to convey the now vertically arranged processing envelopes to the region for their insertion into the underlying boxes and said feeder further comprises a belt conveyor extending within said tray elevator to prevent movement of the processing envelopes relative to trays of the elevator, the horizontal portion of said belt conveyor extending as far as the region in which said envelopes are inserted into said boxes.

2. A sorting line as claimed in a claim 1, wherein the endless conveyor consists of a horizontal chain to which said boxes are coupled.

3. A sorting line as claimed in claim 1, wherein the compartments are provided in cabinets positioned below said endless conveyor.

4. A sorting line as claimed in claim 1, characterized in that in proximity to the lower end of each communication channel there is provided a sensor for detecting the passage of said processing envelopes for determining that the corresponding compartment has been filled.

5. A sorting line as claimed in claim 1, wherein a roller of horizontal axis as applied to the base of each box, to slide along a guide formed from a plurality of segments, each of which is associated with an electromagnet for its retraction to produce a gap in said guide.

6. A sorting line as claimed in claim 3, wherein the communication channels extend within said cabinets, to form different capacity compartments therein.

7. A sorting line as claimed in claim 1, further comprising a main leg for supporting and guiding a first endless conveyor, and at least one branch leg for supporting and guiding a second endless conveyor located at a lower level than said first conveyor, the arrangement of the two legs being such that there exists at least one position in which a box of the first conveyor is exactly above a box of the second conveyor.

8. A sorting line as claimed in claim 7, wherein each conveyor extends as an elongate ring, the vertical longitudinal plane through the conveyor of each branch leg being perpendicular to the longitudinal vertical plane through the conveyor of the main leg.

* * * * *